(12) United States Patent
Potter

(10) Patent No.: US 8,640,761 B2
(45) Date of Patent: Feb. 4, 2014

(54) SYSTEMS AND METHOD FOR A BARRIER WITH INTERCHANGEABLE PANELS

(76) Inventor: Donna Marie Potter, Edwardsville, IL (US)

( * ) Notice: Subject to any disclaimer, the term of this patent is extended or adjusted under 35 U.S.C. 154(b) by 17 days.

(21) Appl. No.: 13/258,254

(22) PCT Filed: Mar. 25, 2010

(86) PCT No.: PCT/US2010/028697
§ 371 (c)(1),
(2), (4) Date: Sep. 21, 2011

(87) PCT Pub. No.: WO2010/111513
PCT Pub. Date: Sep. 30, 2010

(65) Prior Publication Data
US 2012/0006498 A1   Jan. 12, 2012

Related U.S. Application Data

(60) Provisional application No. 61/163,356, filed on Mar. 25, 2009.

(51) Int. Cl.
*A47G 5/00* (2006.01)
(52) U.S. Cl.
USPC .......................................... 160/135; 160/213

(58) Field of Classification Search
USPC .............. 160/135, 213, 199, 235, 196.1, 236, 160/206; 40/606.01, 606.15, 606.16, 40/611.02, 611.03, 611.06, 611.07, 611.1, 40/611.11
See application file for complete search history.

(56) References Cited

U.S. PATENT DOCUMENTS

| | | | | |
|---|---|---|---|---|
| 846,531 | A * | 3/1907 | Viets | 40/606.16 |
| 3,422,878 | A * | 1/1969 | Galietti | 160/199 |
| 3,440,786 | A * | 4/1969 | Weaver | 52/780 |
| 4,790,609 | A * | 12/1988 | Guy | 312/117 |
| 5,626,926 | A * | 5/1997 | Roberts | 428/14 |
| 6,095,226 | A * | 8/2000 | Chen et al. | 160/135 |
| 6,112,445 | A * | 9/2000 | Feeney | 40/747 |
| 6,161,605 | A | 12/2000 | Pena | |
| 6,618,974 | B2 * | 9/2003 | Szalay | 40/611.06 |
| 8,082,971 | B1 * | 12/2011 | Peterson et al. | 160/135 |
| 2002/0084042 | A1 | 7/2002 | Kimmet | |

* cited by examiner

*Primary Examiner* — David Purol
(74) *Attorney, Agent, or Firm* — Armstrong Teasdale LLP

(57) ABSTRACT

A method and system for a barrier system configured to controllably block egress from and ingress to a predetermined area is provided. The barrier system includes a barrier panel that is removable from the barrier system and replaceable with another different barrier panel selectable by a user.

15 Claims, 11 Drawing Sheets

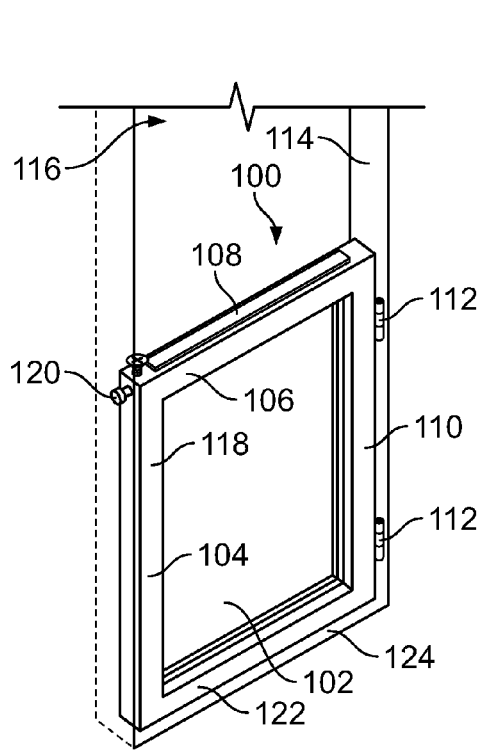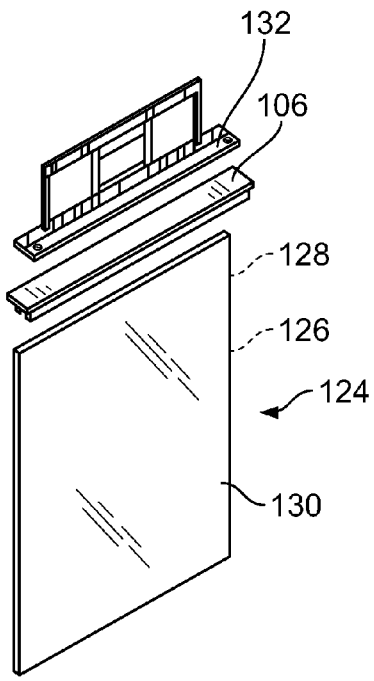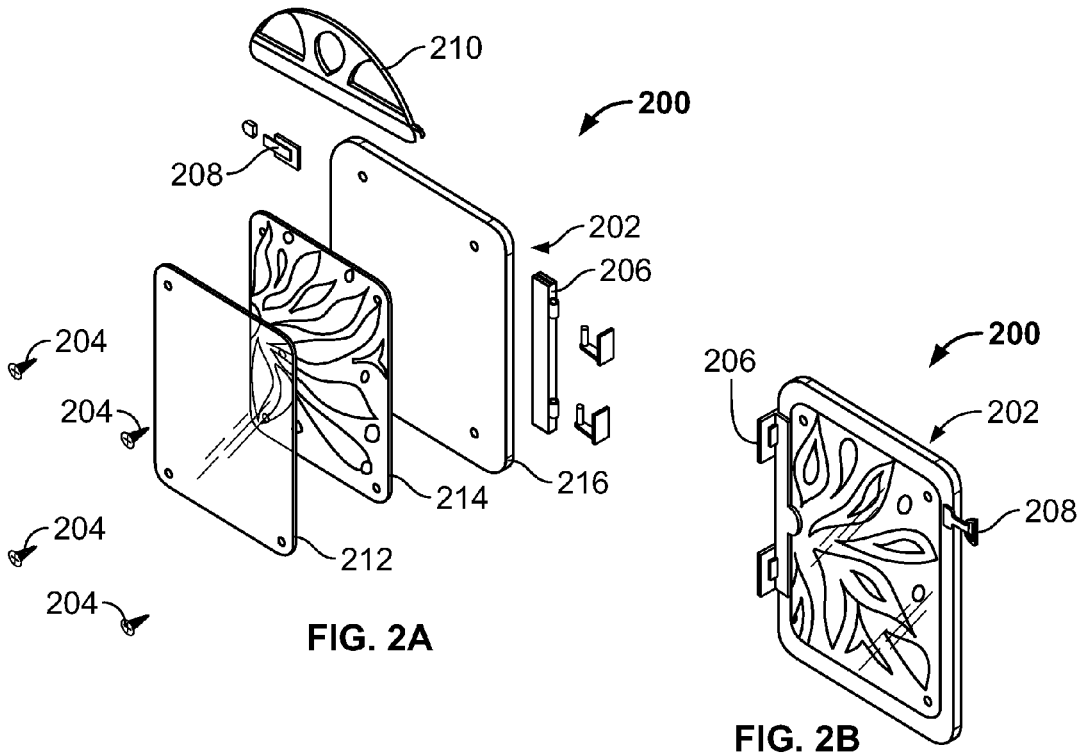
FIG. 1A
FIG. 1B
FIG. 2A
FIG. 2B

SYSTEMS AND METHOD FOR A BARRIER WITH INTERCHANGEABLE PANELS

CROSS REFERENCE TO RELATED APPLICATIONS

This application claims the benefit of U.S. Provisional Patent Application No. 61/163,356 filed Mar. 25, 2009, which is hereby incorporated by reference in its entirety.

BACKGROUND OF THE INVENTION

The field of the invention relates generally to movable barriers, and more specifically, to systems and a method of restricting the movement of children or pets using a movable barrier having interchangeable panels.

A variety of currently existing safety gates are designed and constructed to restrict, prevent or otherwise control the ingress or egress of infants, children, and/or pets within or about a designated area. At least some known of such gates may be adjusted for use in passageways or openings of varying widths or related dimensions. Several such gates often include movable bumpers, which may be extended from and retracted into the safety gate structure to secure or release the safety gate from contiguous openings. Other known gates maybe include several gate panels coupled together side-by-side to form a free-standing or partially supporting freeform corral.

Although the existing gates are able to prevent ingress and egress they do so at an aesthetic cost to the location where the gates are used. Generally, the gate panels are formed of plastic or nylon mesh or wood or plastic slats, giving the gates an institutional appearance that is not in concert with the local areas where the gates are used.

BRIEF DESCRIPTION OF THE INVENTION

In one embodiment, a barrier system is configured to controllably block egress from and ingress to a predetermined area wherein the barrier system includes a barrier panel that is removable from the barrier system and replaceable with another different barrier panel selectable by a user In another embodiment, barrier panel includes an attachment member configured to couple to a support member and a barrier screen supported by the attachment member in a vertical orientation in a position that partially obstructs an opening between an occupancy area and a restricted area, the barrier screen including a first indicia, at least a portion of the barrier screen configured to be removed from the barrier panel and replaced with a second portion.

In yet another embodiment, a method of operating a barrier system is provided. The barrier system includes a barrier panel having a protective sheet and an interchangeable first sheet. The method includes separating the protective sheet and an interchangeable first sheet, selecting an interchangeable second sheet, and joining the protective sheet and the interchangeable second sheet.

BRIEF DESCRIPTION OF THE DRAWINGS

FIGS. 1-5 show exemplary embodiments of the method and apparatus described herein.

FIG. 1A is a perspective view of a gate in accordance with an exemplary embodiment of the present invention;

FIG. 1B is a perspective view of the gate in accordance with another exemplary embodiment of the present invention;

FIG. 2A is an exploded view of a gate in accordance with another exemplary embodiment of the present invention;

FIG. 2B is a perspective view of gate fully assembled;

FIG. 4 is a perspective view of various panels that may be interchanged with a frame to produce the gates;

DETAILED DESCRIPTION OF THE INVENTION

Figure 3A:
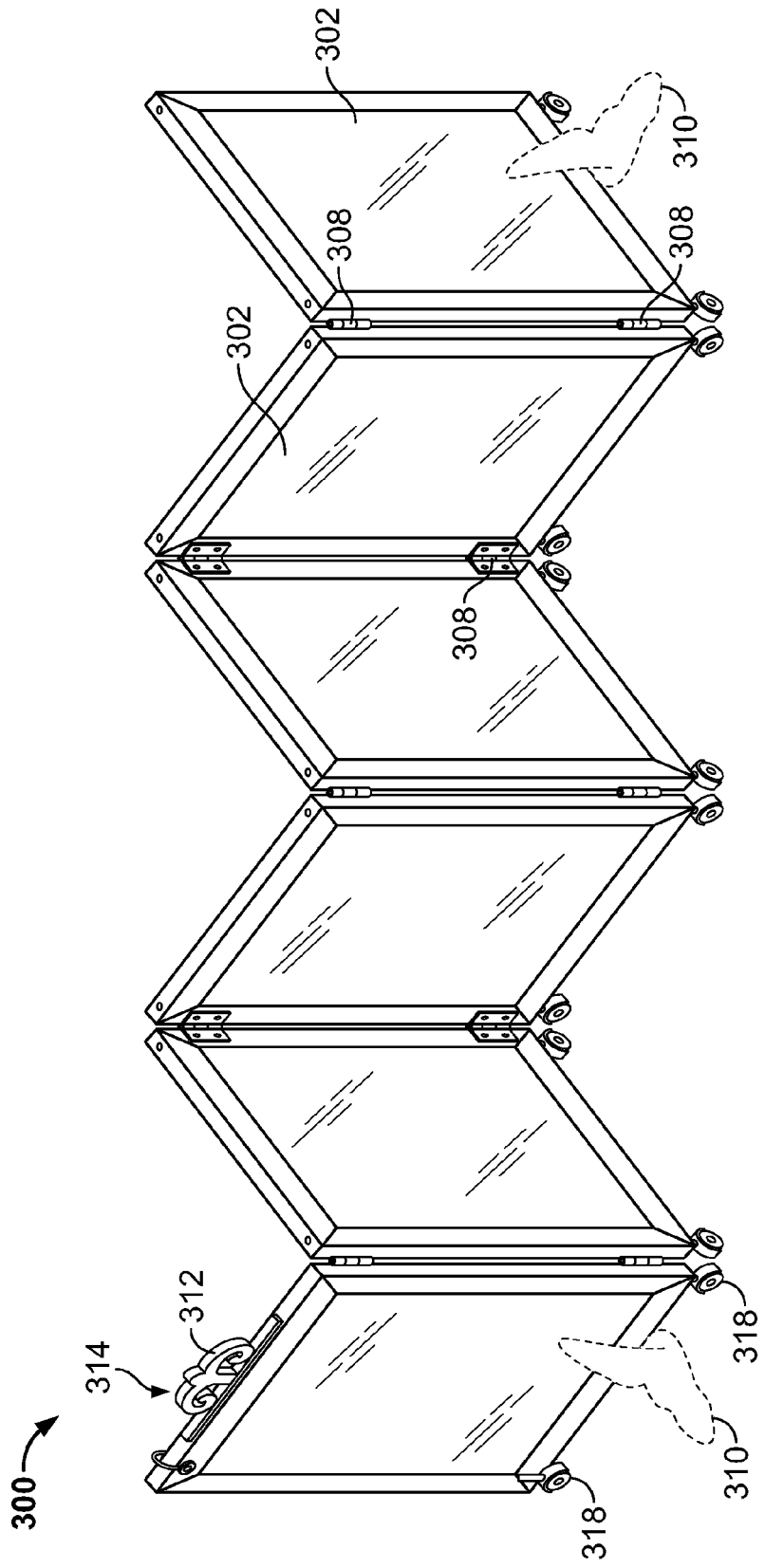
FIG. 3A is a perspective view of a partition formed of a plurality of gate panels 302 coupled together edge-to-edge.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The following detailed description illustrates embodiments of the invention by way of example and not by way of limitation. It is contemplated that the invention has general application to gates and barriers in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

FIG. 1A is a perspective view of a gate 100 in accordance with an exemplary embodiment of the present invention. FIG. 1B is a perspective view of gate 100 in accordance with another exemplary embodiment of the present invention. In the exemplary embodiment, gate 100 includes a gate panel 102 circumscribed by a frame 104. In one embodiment, a top frame member 106 includes a slot 108 that permits ingress and egress of one or more panels 102 through top frame member 106 such that panel 102 is removable and interchangeable with other panels 102. Although described as being secured in frame using a slot and guides, other securement methods are contemplated, including, but not limited to mechanical snaps, magnetic securement, and access portal. Additionally, although a barrier panel may be illustrated as being inserted or removed from a particular side of a frame, it should be understood that insertion and removal through other sides and tops and bottoms of the frames are also contemplated. A first side member 110 includes an attachment device 112 configured to rotatably secure frame 104 to for example a jamb 114 of a doorway 116. In the exemplary embodiment, a second side member 118 includes a latch device 120 configured to secure frame 104 from rotating in a first latched position (shown) and to permit frame 104 to rotate around attachment device 112 in a second unlatched position (not shown in FIG. 1). Frame 104 also includes a bottom frame member 122 that extends proximate a threshold 124 of doorway 116 when gate 100 is closed.

In the exemplary embodiment, gate panel 102 includes a substantially solid single piece of planar material. Gate panel 102 may be transparent, translucent, or opaque and may carry a design selectable by a user. Gate panel 102 may also be formed of a plurality of planar members 124 that may be sandwiched together face-to-face to increase a structural integrity of gate panel 102 or to encase a decorative panel 126 between two structural panels 128 and 130. Panels 128 and 130 may be transparent, translucent to permit display a design on decorative panel 126. Additionally, planar members 124 may only be two in number and can be used to sandwich and support decorative or informative items between planar members 124. For example, photos, handbills, pressed floral pieces, ribbons, napkins, coasters, ticket stubs, and other mementos may be placed between planar members 124 prior to inserting planar members 124 into frame 104 to create a collage type of decoration. Friction or adhesive may be used to secure the decorative or informative items to planar members 124. In another embodiment, gate panel 102 may include interchangeable architectural elements such as, but not limited to a decorative cornice or plate.

In an alternative embodiment, top frame member 106 is substantially solid and removable from frame 104 to permit removing gate panel 102 from frame 104 and to install a replacement gate panel 102 into frame 104. In another alternative embodiment, gate panel 102 or panels 126, 128, and 130 may be replaced through first side member 110, second side member 118, or bottom frame member 122. Additionally, one or both of structural panels 128 and 130 may be hinged along one edge to permit access to decorative panel 126 by swinging structural panel 128 and 130 out away from decorative panel 126. Optionally, top frame member 106 may include a crown piece 132 that may be a decorative member selectable by the user to enhance the appearance of gate 100.

Gate panels 102 may be formed of for example, including but not limited to plastic, organic material, fibers, photography, resin, metal, and wood. Gate panels 102 may be formed in various shapes, including but not limited to, square, rectangular, trapezoidal, and triangular such that gate panels of different sizes and shapes may be arranged adjacent with respect to each other to form a combination gate panel.

FIG. 2A is an exploded view of a gate 200 in accordance with another exemplary embodiment of the present invention. FIG. 2B is a perspective view of gate 200 fully assembled. In this exemplary embodiment, gate 200 includes one or more gate panels 202 that are unframed and coupled together using for example, inference fasteners 204. Gate 200 includes an attachment mechanism 206 and a latch 208. Additionally, gate 200 may include a crown piece 210. Gate panels 202 may include a first panel 212, a second panel 214, and a third panel 216. First and third panels 212 and 214 may be substantially identical to provide a transparent or translucent covering for second panel 214, which may include a decorative or informative design. Second panel 214 may be replaced by unfastening fasteners 204, separating first and third panels 212 and 214 and substituting another second panel 214. In this way, many varieties of designs may be easily and inexpensively interchanged to provide a different aesthetic appearance that may be related to the seasons, holidays, or other occasion.

In an alternative embodiment, first and third panels 212 and 214 may be formed of a framework resembling window panes, wrought iron fencing, or trellis.

Figure 3B:
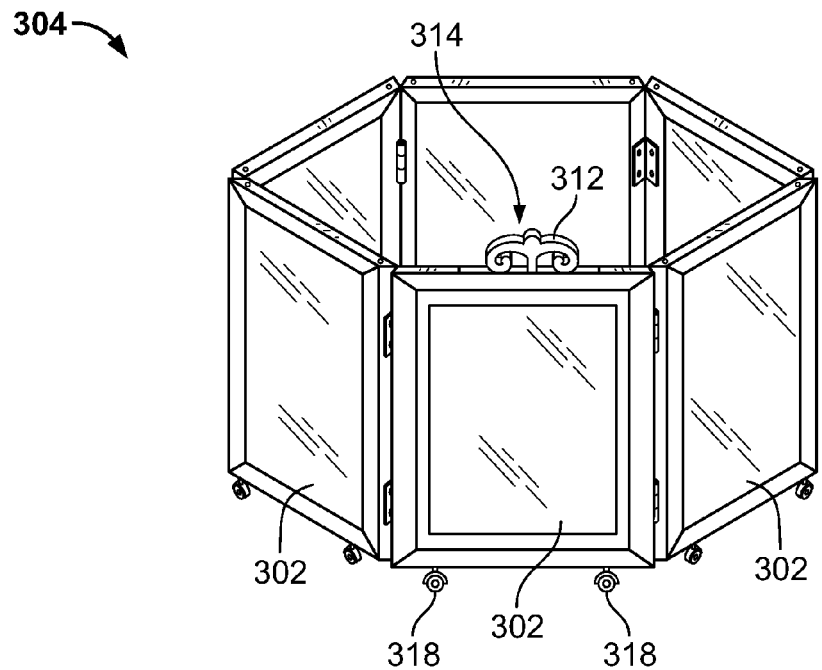
FIG. 3B is a perspective view of a pen or corral formed of gate panels 302 arranged to form a closed in enclosure.
Figure 3C:
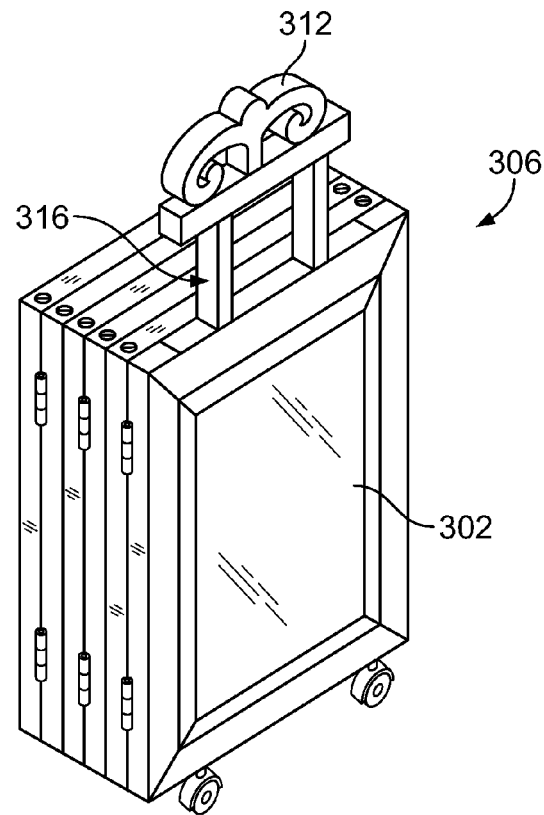
FIG. 3C is a perspective view of gate panels folded against each other forming a compact transportable assembly.

FIG. 3A is a perspective view of a partition 300 formed of a plurality of gate panels 302 coupled together edge-to-edge. FIG. 3B is a perspective view of a pen or corral 304 formed of gate panels 302 arranged to form a closed in enclosure. FIG. 3C is a perspective view of gate panels 302 folded against each other forming a compact transportable assembly 306.

In the exemplary embodiment, a plurality of gate panels 302 may be coupled together using attachment devices 308 configured to allow adjacent panels to fold in alternating directions or in the same direction. Using such a fanfold configuration, gate panels may be stood free standing in the middle of a room not immediately proximate to a support to which one of gate panels 302 may be attached. In one embodiment, gusseted feet 310 are extendable or foldable from one or more of plurality of gate panels 302 to provide a stable platform for supporting plurality of gate panels 302 upright when plurality of gate panels 302 are extended to be approximately straight with respect to each other. Although arranging plurality of gate panels 302 is a zigzag arrangement provides sufficient stability for free-standing plurality of gate panels 302, gusseted feet provide stability when plurality of gate panels 302 is arranged in a substantially straight arrangement.

At least one of plurality of gate panels 302 includes a retractable handle 312 that may be moved from a first retracted position 314 to a second extended position 316. One or more wheels or casters 318 are positioned on a side of the at least one of plurality of gate panels 302 opposite handle 312. Accordingly, partition 300 may be folded into compact transportable assembly 306 to be transported to a desired location using casters 318 and handle 312. Upon arrival at the desired location, handle 312 may be moved to retraced position 314 and plurality of gate panels 302 extended in a desired configuration.

Figure 4:
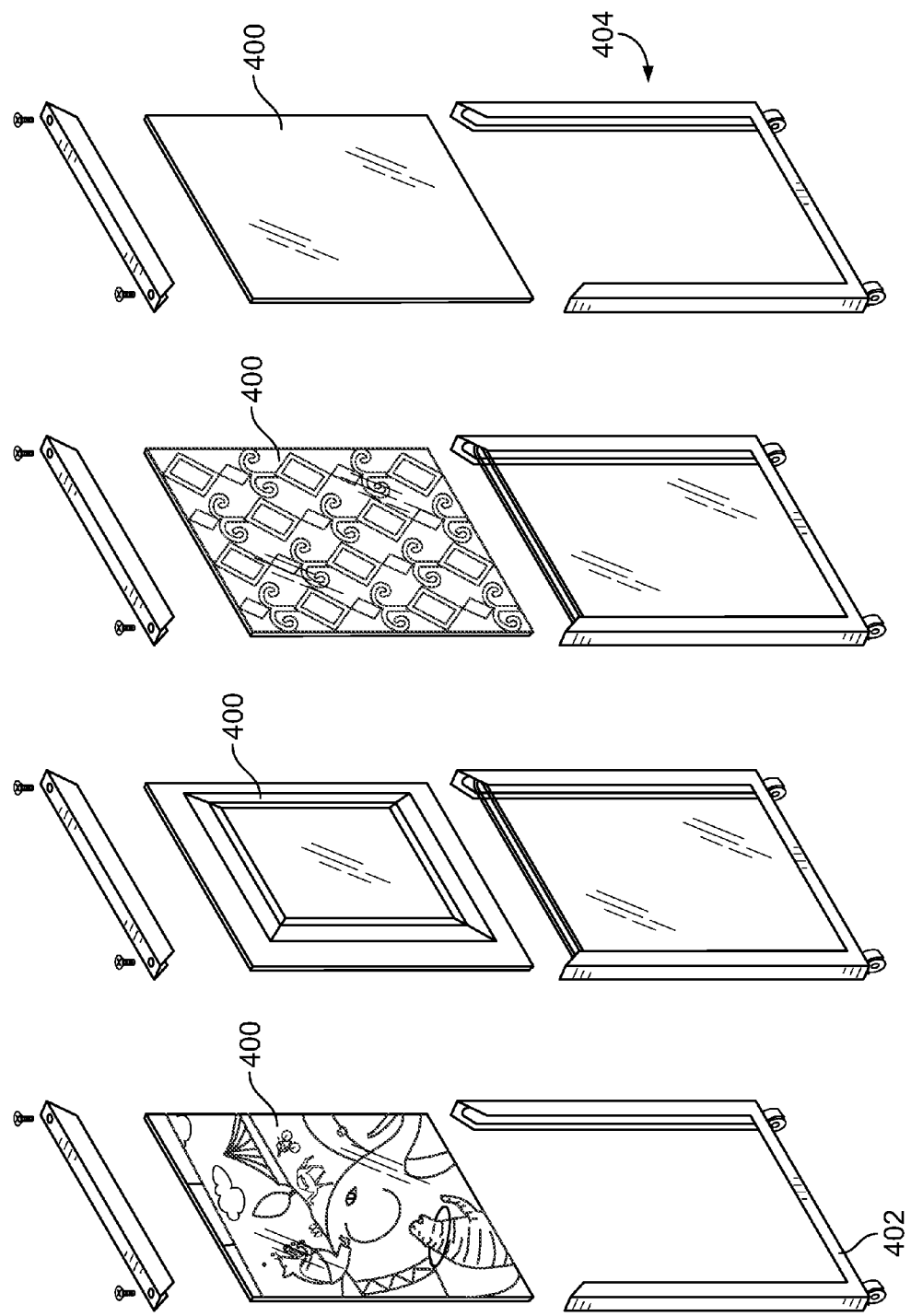

FIG. 4A is a perspective view of various panels 400 that may be interchanged with a frame 402 to produce gates 404. In one embodiment, panel 400 may include scenery. In another embodiment, panel 400 may include a solid raised panel that may be complementary to doors or cabinets in the area where gate 400 is used. In yet another embodiment, panel 400 may include a geometric design, and in still another embodiment, panel 400 may be transparent, clear, colored, or translucent.

Figures 5A, 5B:
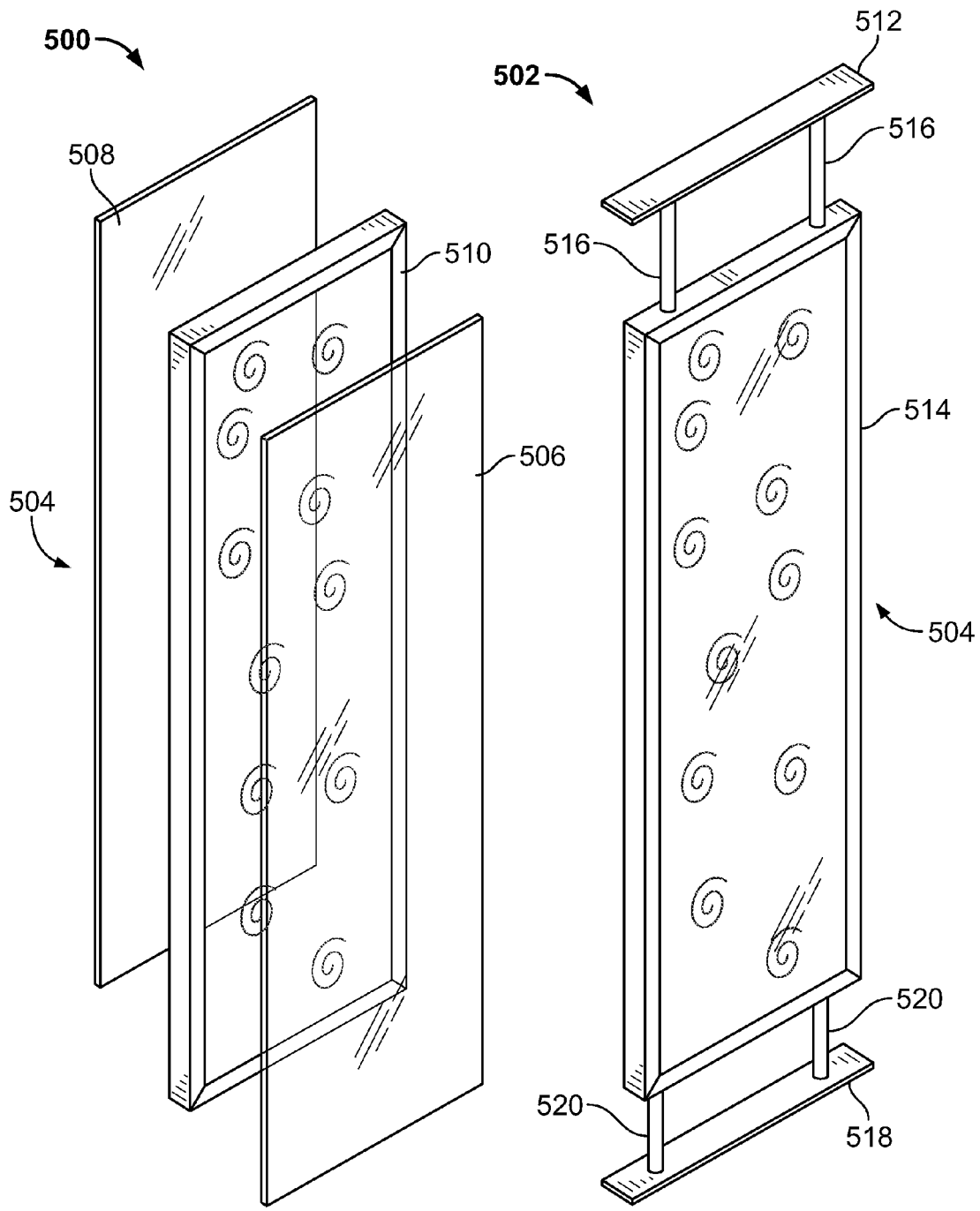
FIG. 5A is an exploded view of a divider panel in accordance with an exemplary embodiment of the present invention.
FIG. 5B is a perspective view of a wall divider assembly that may be used with divider panel.

FIG. 5A is an exploded view of a divider panel 500 in accordance with an exemplary embodiment of the present invention. FIG. 5B is a perspective view of a wall divider assembly 502 that may be used with divider panel 500. In the exemplary embodiment, divider panel 500 comprises three panels 504. A first panel 506 and a second panel 508 provide protection and support for a third panel 510, which is primarily decorative. Wall divider assembly 502 includes an upper engagement member 512 for engaging, for example, a ceiling of a room (both not shown in FIG. 5B). Upper engagement end 512 is coupled to a frame 514 supporting panels 504 using outwardly extending legs 516. Similarly, a lower engagement member 518 is coupled to frame 514 through outwardly extending legs 520. Legs 516 and/or legs 520 may be outwardly biased using for example, a spring to facilitate a friction fit between legs 516 and legs 520 and the ceiling and a floor, respectively.

Figure 6:
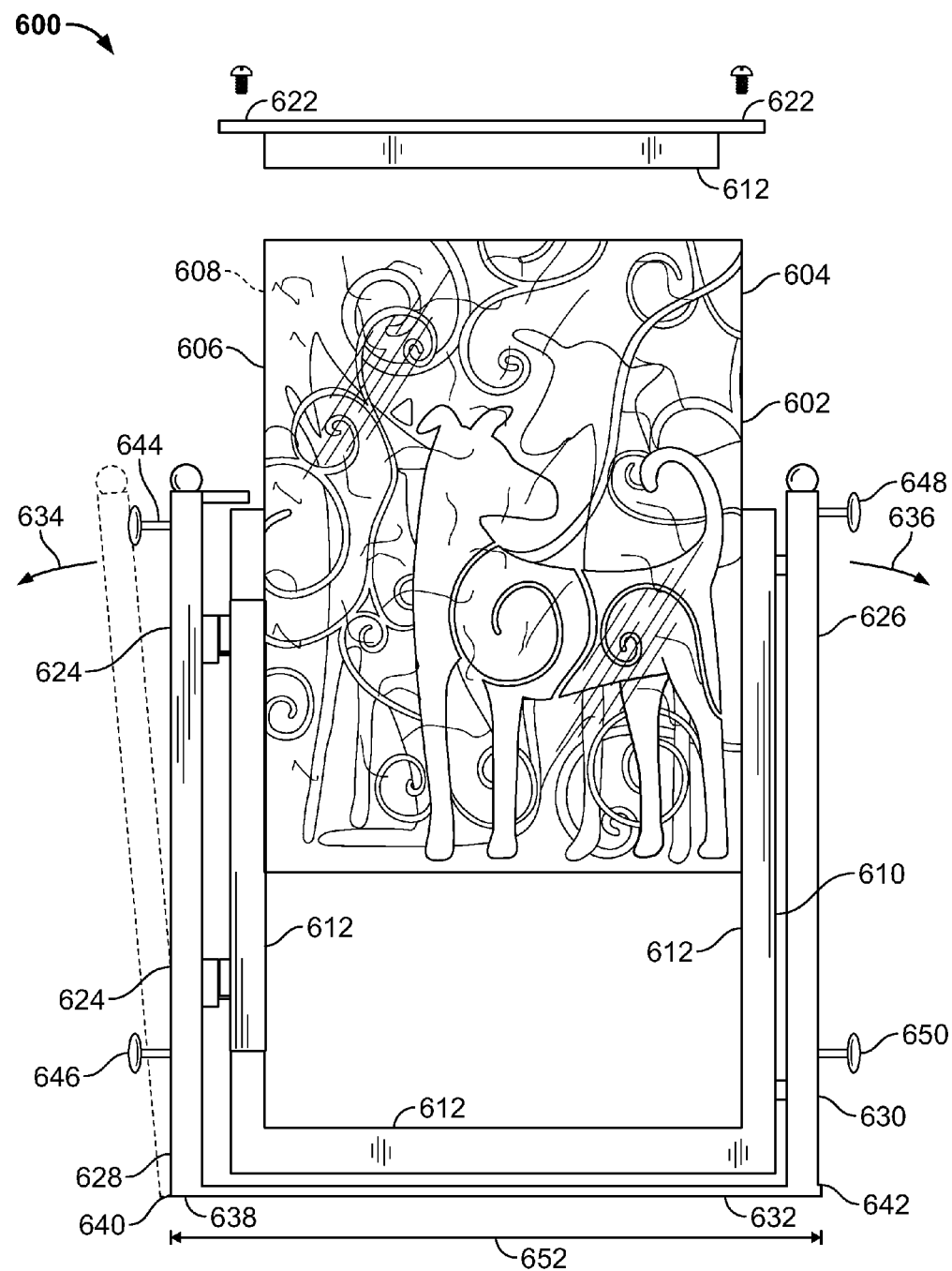
FIG. 6 is a perspective view of a barrier system in accordance with an exemplary embodiment of the present invention.

FIG. 6 is a perspective view of a barrier system 600 in accordance with an exemplary embodiment of the present invention. Barrier system 600 is configured to controllably block egress from and ingress to a predetermined area. For example, barrier system 600 may be placed in a doorway between a first room where for example, a child or a pet is desired to remain and a second room from which the child or pet is desired to be restricted. Although describes as rooms, first and second rooms may represent other areas of occupancy or restriction, such as, but not limited to hallways, stairways, garages and the like. Barrier system 600 includes a barrier panel 602. In one embodiment, barrier panel 602 is removable from barrier system 600 and replaced with another different barrier panel (not shown in FIG. 6) selectable by a user. In another embodiment, barrier panel 602 includes a plurality of barrier sheets sandwiched together face-to-face. Accordingly, barrier panel 602 may include for example, two sheets of material such as, but not limited to plastic in face-to-face contact with each other. One of the sheets 604 may be a decorative sheet including a design or artwork. Decorative sheet 604 may be replaced by another decorative sheet having a different design. In still another embodiment, barrier panel 602 may include decorative sheet 604, a first protective sheet 606, and a second protective sheet 608. Decorative sheet 604 may be sandwiched between first protective sheet 606 and second protective sheet 608. In various embodiments, objects may be sandwiched between first protective sheet 606 and second protective sheet 608 such as, but not limited to mementos, greeting cards, child's artwork, photographs, or other scrapbook items. First protective sheet 606 and second protective sheet 608 are at least partially at least one of transparent and translucent. In addition, first protective sheet 606 and second protective sheet 608 are solid as opposed to an open weave, mesh, or perforated sheet.

Barrier panel 602 may also include a frame 610. Frame 610 may completely circumscribe sheets 604, 606, and/or 608 or may only partially circumscribe sheets 604, 606, and/or 608. In the exemplary embodiment, frame 610 includes a groove 612 along an inner surface of each leg 614 and 616 of frame 610 and a bottom 618 and a crown 620 of frame 610. Groove 612 forms a channel through which edges of sheets 604, 606, and/or 608 may be slid to insert and remove sheets 604, 606, and/or 608 from frame 610. Crown 620 is removably coupled to legs 614 and/or 616 using a fastening member 622 such as, but not limited to a latch, a fastener, a catch, and/or a biased pawl.

One or more attachment members 624 such as, but not limited to hinges couple to frame 610 in one embodiment or directly to barrier panel 602 in another embodiment. Attachment members 624 also couple to a support member 626 or directly to for example, but not limited to a door jamb, a handrail, a ceiling, and/or a floor. In the exemplary embodiment, support member 626 comprises a pressure mount assembly that includes a first vertical leg 628, a second vertical leg 630, and a threshold leg 632. At least one of first vertical leg 628 and second vertical leg 630 are biased in an outward direction 634 and 636, respectively using a bias member 638. In one embodiment, bias member 638 comprises at least one of a spring, a resilient member, and a pressurized cylinder. In another embodiment, bias member 638 comprises a flexure feature of a joint 640 between first vertical leg 628 and threshold leg 632 and/or a joint 642 between second vertical leg 630 and threshold leg 632. At least one of first vertical leg 628 and second vertical leg 630 include one or more tension adjustments 644, 646, 648, and 650 that facilitate adjusting a force holding barrier system 600 in place and matching a width 652 of barrier system 600 to width of an opening such as, but not limited to a doorway (not shown).

Figure 7:
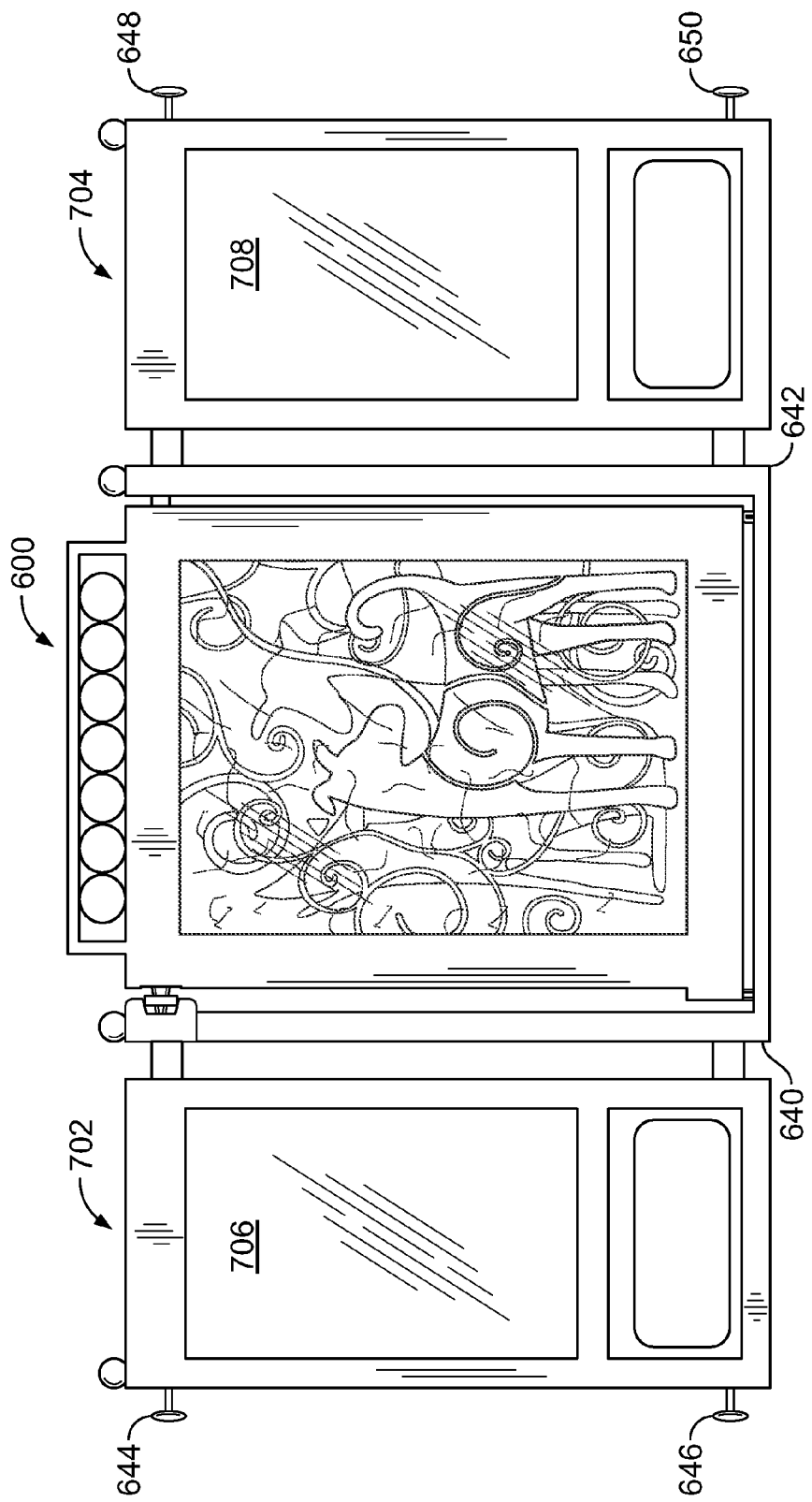
FIG. 7 is a perspective view of barrier system shown in FIG. 6 in accordance with another exemplary embodiment of the present invention.

FIG. 7 is a perspective view of barrier system 600 (shown in FIG. 6) in accordance with another exemplary embodiment of the present invention. In the exemplary embodiment, barrier system 600 includes one or more barrier extensions 702 and 704. Barrier extensions 702 and 704 include interchangeable panels 706 and 708, which may comprise one or more decorative and/or protective sheets as described above in relation to FIG. 6.

Figure 8:
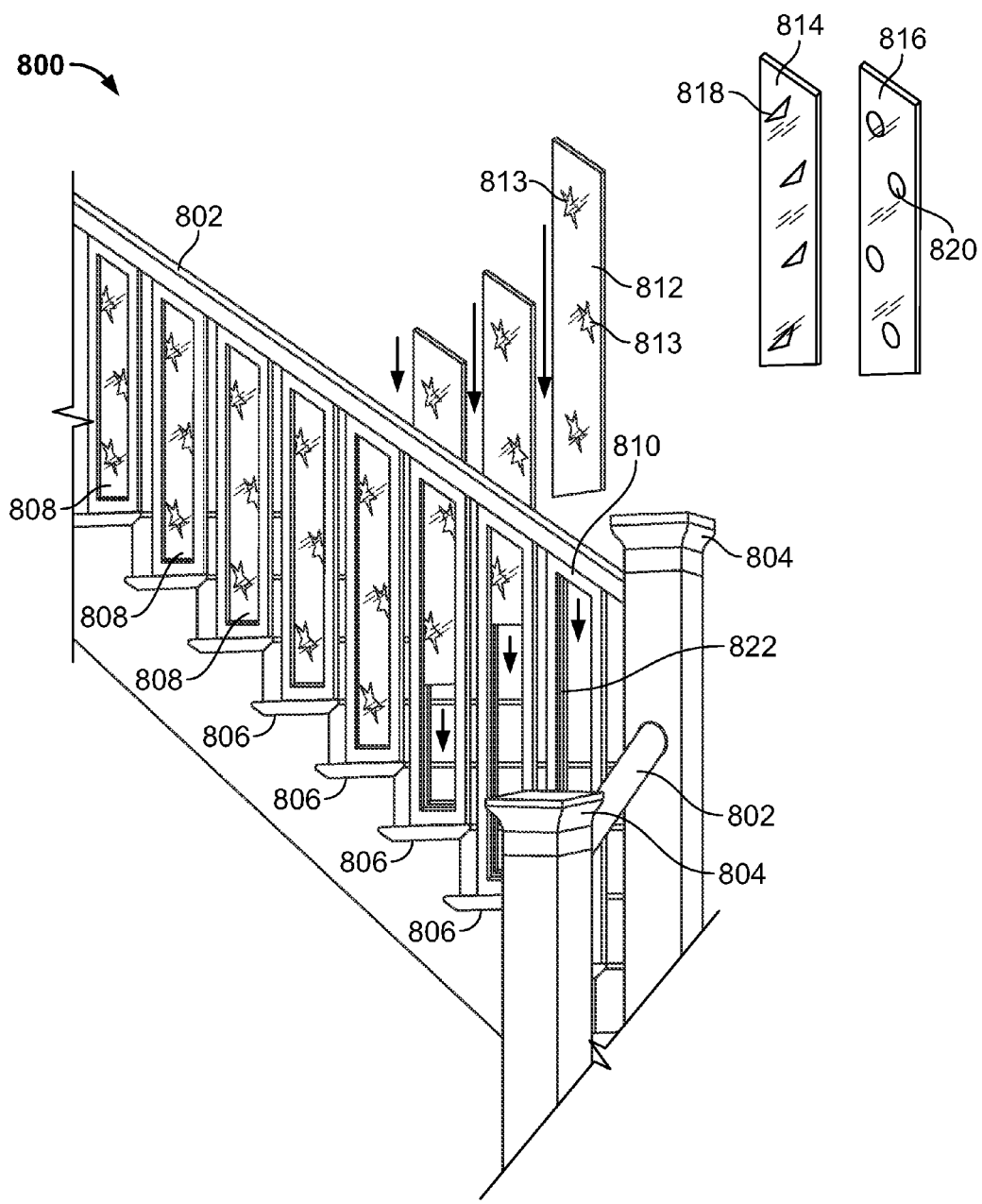
FIG. 8 is a perspective view of a staircase handrailing system 800 in accordance with an exemplary embodiment of the present invention.

FIG. 8 is a perspective view of a staircase handrailing system 800 in accordance with an exemplary embodiment of the present invention. In the exemplary embodiment, staircase handrailing system 800 includes a handrail 802 and newel posts 804 to provide guidance and support when traversing a plurality of stairs 806. As opposed to traditional staircase handrailing systems, staircase handrailing system 800 includes a plurality of barrier panels 808 rather than traditional balusters. In the exemplary embodiment, barrier panels 808 each include a frame 810 and a barrier sheet 812. Barrier sheets 812 include indicia 813 and are interchangeable with other barrier sheets 814 and 816 having different indicia 818 and 820, respectively. The indicia may be decorative or informative such as, but not limited to company signage, logos, and text, for example, quotes, wordings and sayings. Barrier sheets 812 may include only a single sheet and may be at least partially translucent or transparent. Barrier sheets 812 may fit in sliding engagement within a groove or slot formed in frame 810.

Figure 9:
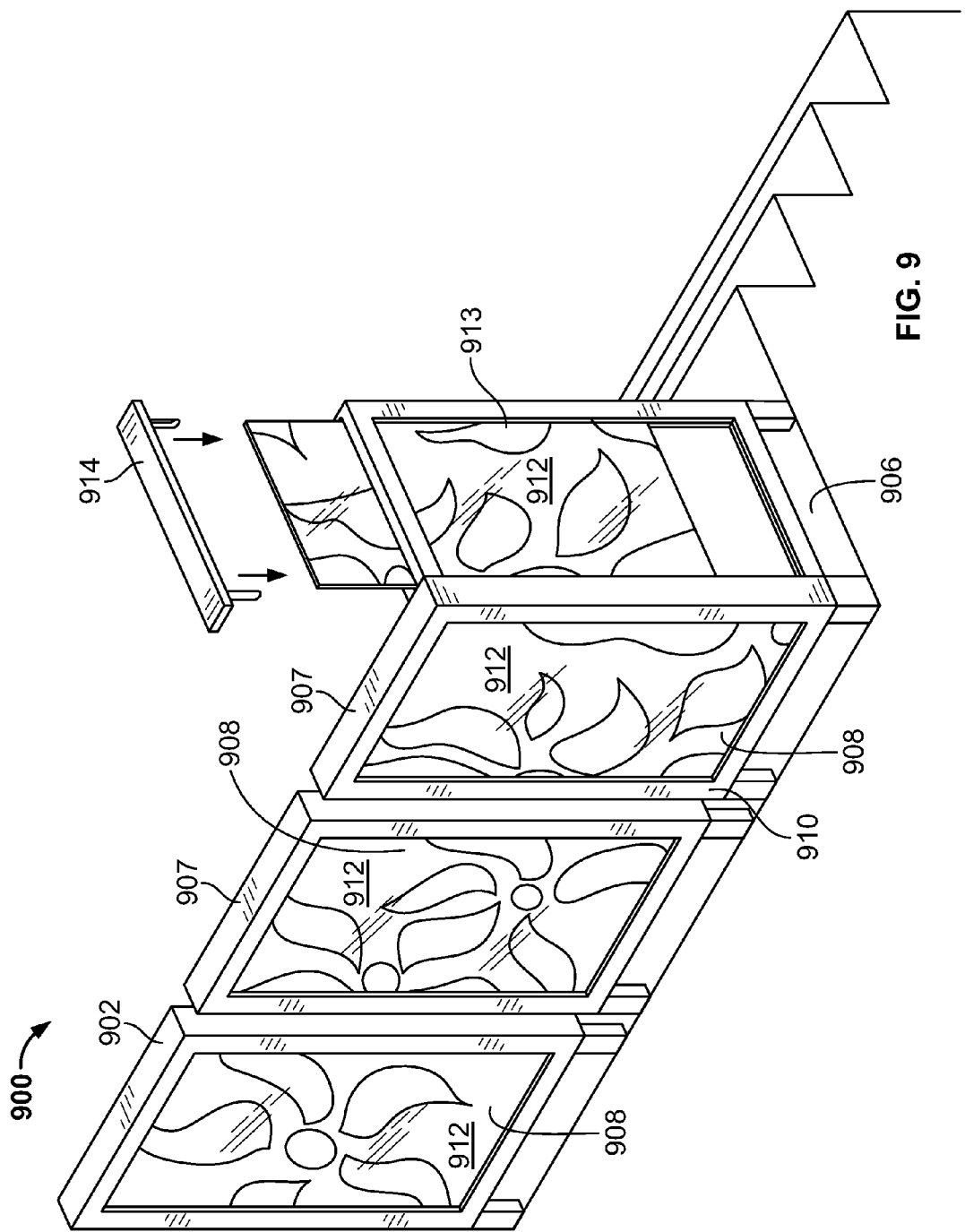
FIG. 9 is a perspective view of a balcony handrailing system 900 in accordance with an exemplary embodiment of the present invention.

FIG. 9 is a perspective view of a balcony handrailing system 900 in accordance with an exemplary embodiment of the present invention. In the exemplary embodiment, staircase handrailing system 900 includes a handrail 902 to provide support when using a balcony or other platform 906. Handrail 902 may comprise a single solid handrail or handrail 902 may comprise a series of handrail segments 907. As opposed to traditional balcony handrailing systems, balcony handrailing system 900 includes a plurality of barrier panels 908 rather than traditional balusters. In the exemplary embodiment, barrier panels 908 each include a frame 910 and a barrier sheet 912. Barrier sheets 912 include indicia 913 and are interchangeable with other barrier sheets having different indicia. Indicia 913 may be decorative or informative. Barrier sheets 912 may include only a single sheet and may be at least partially translucent or transparent or may comprise a plurality of barrier sheets 912 in face-to-face contact with adjacent sheets. Barrier sheets 912 may fit in sliding engagement within a groove or slot formed in frame 910. In the exemplary embodiment, a crown member 914, which also forms a portion of handrail 902 is used to retain barrier sheets 912 within frame 910.

Figure 10B:
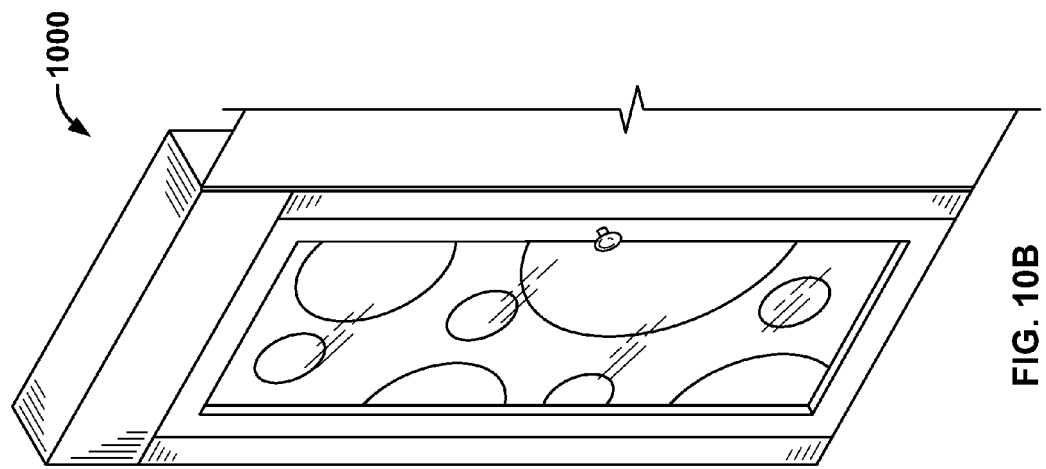
FIG. 10B is a perspective view of door 1000 in a second closed position.
Figure 10A:
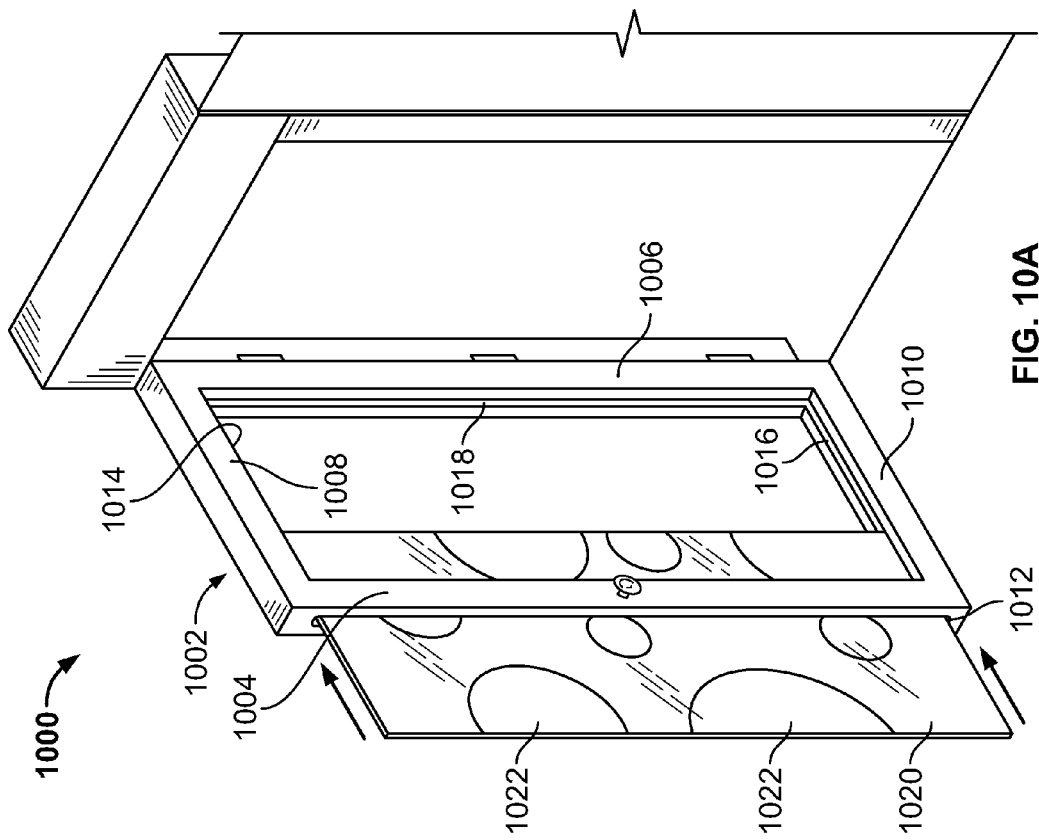
FIG. 10A is a perspective view of a door 1000 in a first open position in accordance with an exemplary embodiment of the present invention.

FIG. 10A is a perspective view of a door 1000 in a first open position in accordance with an exemplary embodiment of the present invention. In the exemplary embodiment, door 1000 includes a frame 1002 that includes a first vertical leg 1004, a second vertical leg 1006, a top leg 1008, and a bottom leg 1010. First vertical leg 1004 includes a slot 1012 therethrough and each of top leg 1008, bottom leg 1010, and second vertical leg 1006 includes a groove 1014, 1016, and 1018 along an inner surface, respectively. Door 1000 includes an interchangeable panel 1020 that includes indicia 1022. Panel 1020 is received through slot 1012 and grooves 1014 and 1016 while positioning panel 1020 within frame 1002. Panel 1020 is seated against a bottom of groove 1018 when fully inserted into frame 1002. Panel 1020 may be removed from frame 1002 and replaced by another panel (not shown) to alter the appearance or functionality of door 1000. FIG. 10B is a perspective view of door 1000 in a second closed position. In various embodiments, door 1000 includes a cabinet door, a seven plus wall door, and a pocket door. Such doors may swing on hinges or be sliding or bypass doors.

Figure 11:
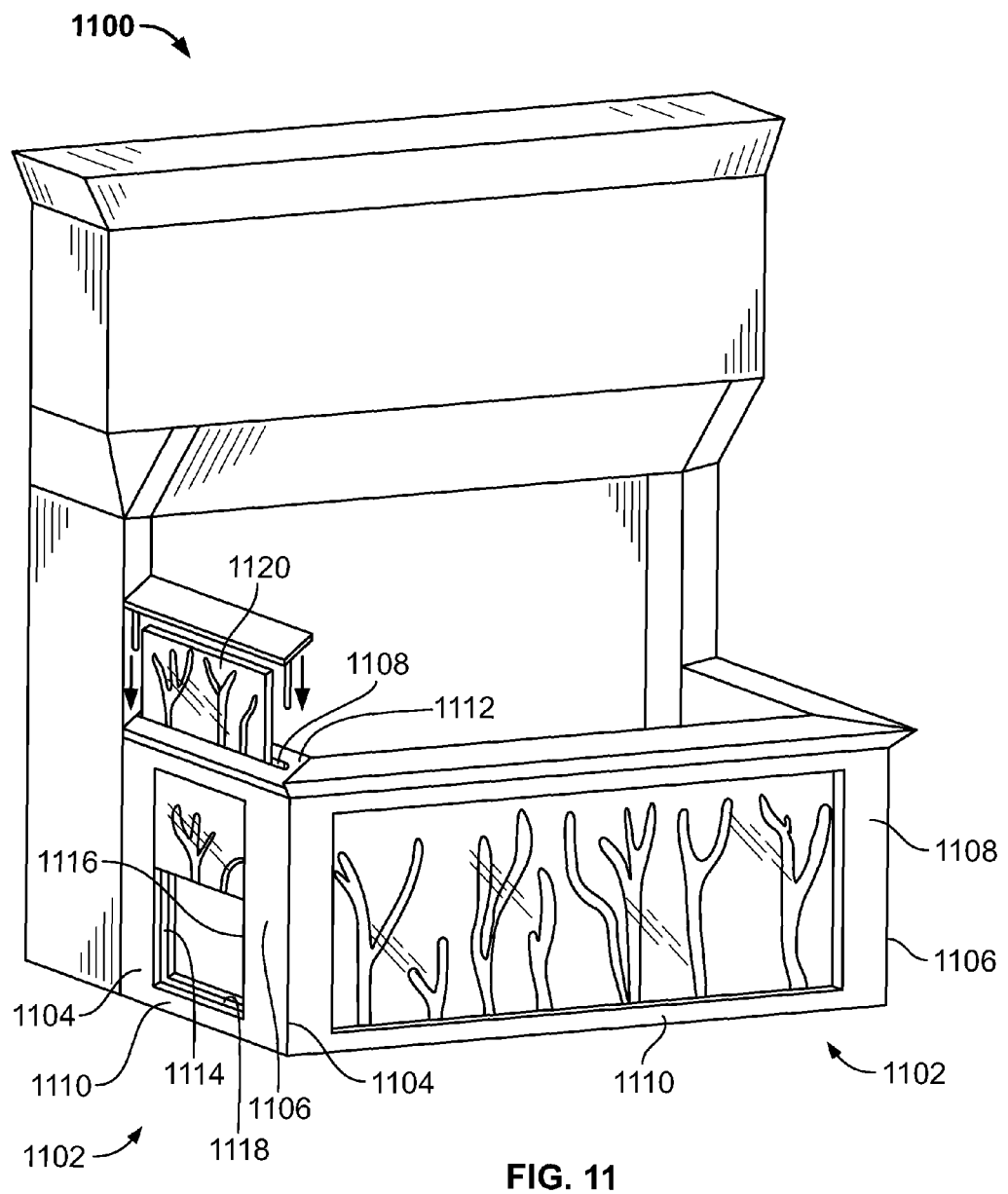
FIG. 11 is a perspective view of a fireplace screen 1100 in accordance with an exemplary embodiment of the present invention.

FIG. 11 is a perspective view of a fireplace screen 1100 in accordance with an exemplary embodiment of the present invention. In the exemplary embodiment, fireplace screen 1100 includes one or more frames 1102 that includes a first vertical leg 1104, a second vertical leg 1106, a top leg 1108, and a bottom leg 1110. Top leg 1108 includes a slot 1112 therethrough and each of first vertical leg 1104 and second vertical leg 1106 and bottom leg 1110 includes a groove 1114, 1116, and 1118 along an inner surface, respectively. door 1100 includes an interchangeable panel 1120 that includes indicia 1122. Panel 1120 is received through slot 1112 and grooves 1114 and 1116 while positioning panel 1120 within frame 1102. Panel 1120 is seated against a bottom of groove 1118 when fully inserted into frame 1102. Panel 1120 may be removed from frame 1102 and replaced by another panel (not shown) to alter the appearance or functionality of fireplace screen 1100.

The above-described embodiments of a method and system of gates having interchangeable panels provides a cost-effective and reliable means for providing safety and security for children and/or pets in an aesthetically pleasing manner. More specifically, the methods and systems described herein facilitate changing an appearance of the gates to match a user's preference while maintaining the structural and containment functions of the gate. As a result, the methods and systems described herein facilitate protecting children and/or pets in a cost-effective and reliable manner.

The various examples of interchangeable panels may by used in either the framed or frameless embodiments and may include, in addition to decorative or informative patterns, textual information, and photographs, activity layouts to facilitate play by children. For example, a panel may provide a background for facilitating play using static plastic adherent figures. The panel may include a neighborhood layout including streets, parks, and stores. The panels are configured to receive the static plastic figures of for example, but not limited to people, animals, cars, trucks, and other objects that are associated with movement about a neighborhood. A child playing then applies the figures according to the child's preference on the supplied background on the selected panel. The panels and barrier systems described above are usable indoors as well as outdoors.

Exemplary methods and apparatus for restricting the movement of children or pets are described above in detail. The apparatus illustrated is not limited to the specific embodiments described herein, but rather, components of each may be utilized independently and separately from other components described herein. Each system component can also be used in combination with other system components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A barrier system configured to controllably block egress from and ingress to a predetermined area, said barrier system comprising:
a barrier panel comprising a frame circumscribing a barrier screen, said frame comprising a first side member, an opposing second side member, top frame member, and an opposing bottom frame member, said barrier screen including a protective sheet that is at least one of transparent and translucent such that viewing the predetermined area through the barrier system is permitted, said barrier screen is removable from said barrier panel and replaceable with another different barrier screen selectable by a user; and
a support device comprising a pressure mount assembly configured to support the barrier panel in a vertical orientation through at least one of said first side member, said second side member, and said bottom frame member, at least one of a first support device side member and a second support device side member being biased in an outward direction using a bias member.

2. A barrier system in accordance with claim 1, wherein said barrier panel is at least partially at least one of transparent and translucent.

3. A barrier system in accordance with claim 1, wherein said barrier panel comprises a plurality of barrier screens.

4. A barrier system in accordance with claim 3, wherein at least one of said plurality of barrier screens comprises at least one of indicia and an object.

5. A barrier system in accordance with claim 4, wherein said indicia comprises an aesthetic decoration.

6. A barrier system in accordance with claim 1, further comprising an attachment member pivotably coupled to said barrier panel, said attachment member configured to support said barrier panel in an operative position.

7. A barrier system in accordance with claim 6, wherein said attachment member comprises a hinge assembly.

8. A barrier system in accordance with claim 7, wherein said hinge assembly comprises a support member configured to couple to a door jamb.

9. A barrier system in accordance with claim 8, wherein said support member includes a bias member configured to apply a force laterally away from said barrier panel such that said barrier panel is supported in a vertical orientation.

10. A barrier panel comprising:
a support member comprising a pressure mount assembly that includes a first vertical leg, a second vertical leg, and a threshold leg, at least one of said first vertical leg and said second vertical leg being biased in an outward direction using a bias member;
an attachment member configured to couple a frame to the support member; and
a barrier screen supported in a single groove formed in said frame in a vertical orientation in a position that partially obstructs an opening between an occupancy area and a restricted area, said barrier screen comprising an object sandwiched between two protective sheets, the two protective sheets supporting the object in the frame, at least a portion of said barrier screen configured to be removed from the barrier panel and replaced with a second portion, where said protective sheets are at least one of transparent and translucent such that viewing between the occupancy area and the restricted area is permitted.

11. A barrier panel in accordance with claim 10, wherein said attachment member comprises a hinge assembly.

12. A barrier panel in accordance with claim 10, wherein said barrier screen comprises a decorative portion and a protective sheet.

13. A barrier panel in accordance with claim 10, wherein said barrier screen is at least one of at least partially transparent and at least partially translucent.

14. A barrier panel in accordance with claim 10, wherein said barrier panel comprises a decorative portion sandwiched between two protective sheets.

15. A barrier panel in accordance with claim 14, wherein said plurality of protective sheets each comprise an edge, at least two of said plurality of protective sheets hingedly coupled at respective edges.

\* \* \* \* \*